(12) United States Patent
Sugiyama (10) Patent No.: US 7,099,524 B2
(45) Date of Patent: Aug. 29, 2006

(54) OPTICAL MODULATOR (75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 10/990,383

(22) Filed: Nov. 18, 2004

(65) Prior Publication Data
US 2006/0029319 A1 Feb. 9, 2006

(30) Foreign Application Priority Data
Aug. 5, 2004 (JP) .............................. 2004-229268

(51) Int. Cl.
*G02F 1/035* (2006.01)
(52) U.S. Cl. .................... 385/3; 385/1; 385/2; 359/238
(58) Field of Classification Search .................... 385/1, 385/2, 3; 359/238
See application file for complete search history.

(56) References Cited

U.S. PATENT DOCUMENTS 5,455,876 A * 10/1995 Hopfer et al. ................ 385/2
6,646,776 B1 * 11/2003 Cheung et al. ............. 359/254
6,700,691 B1 * 3/2004 Nespola et al. ............. 359/254
6,885,780 B1 * 4/2005 Cheung et al. ................ 385/2

FOREIGN PATENT DOCUMENTS

| JP | 11-101962 | 4/1999 |
|----|-----------|--------|
| JP | 2001-194637 | 7/2001 |
| JP | 2003-228033 | 8/2003 |
| JP | 2003-233047 | 8/2003 |

* cited by examiner

Primary Examiner—Jennifer Doan
(74) Attorney, Agent, or Firm—Staas & Halsey LLP (57) ABSTRACT

The present invention relates to an optical modulator capable of preventing a disconnection of an electrode and improving a discontinuity of a characteristic impedance while realizing a polarization inverting area and a ridge waveguide in a single optical modulator. In the optical modulator, a first electrode is composed of an inverting area electrode portion formed on an upper portion of one of first and second waveguides in the polarization inverting area, a non-inverting area electrode portion formed on an upper portion of the other one of the first and second waveguides in the other area, and a connection portion for making a connection between the inverting area electrode portion and the non-inverting area electrode portion at the boundary between the polarization inverting area and the other area. A supporting mechanism for supporting the connection portion of the first electrode is provided in a groove.

22 Claims, 9 Drawing Sheets

FIG. 12C
RELATED ART

OPTICAL MODULATOR

BACKGROUND OF THE INVENTION

1) Field of the Invention

The present invention relates to an optical modulator suitable, for example, for use in the field of optical communications.

2) Description of the Related Art

An optical modulator using an electro-optical crystal such as an LiNbO$_3$ (lithium niobate, which will hereinafter be referred to simply as LN) substrate or an LiTaO$_2$ substrate is formed by placing electrodes in the vicinity of an optical waveguide, which is formed in a manner such that a metal film is formed at a portion of the crystal substrate and thermally diffused or proton-replaced in benzoic acid after patterning to form an optical waveguide.

Usually, as the optical waveguide of the optical modulator, there is employed a Mach-Zehnder optical waveguide comprising an incidence waveguide, two parallel waveguides and an outgoing waveguide, with a signal electrode and an earth electrode being provided on the parallel wageguide to form a coplanar electrode. In the case of the employment of a Z-cut substrate, an electrode is located just above the optical waveguide because of the utilization of a variation of refractive index due to an electric field in the Z direction. At this time, a signal electrode and an earth electrode are patterned on parallel waveguides, respectively, and for the purpose of preventing the light propagated in the parallel electrodes from being absorbed by the signal electrode and the earth electrode, a buffer layer is interposed between the LN substrate and the signal electrode/earth electrode. As the buffer layer, for example, there is employed SiO$_2$ having a thickness of approximately 0.2 µm to 1 µm.

For driving the optical modulator at a high speed, the signal electrode and an endpoint of the earth electrode are connected to each other through a resistor to establish a traveling-wave electrode and a microwave signal is applied thereto from the input side. At this time, due to the electric field, the refractive indexes of the two parallel waveguides vary like +Δna and −Δnb and the phase difference between the two parallel waveguides varies so that a signal light intensity-modulated is outputted from the outgoing waveguide.

Figure 9:
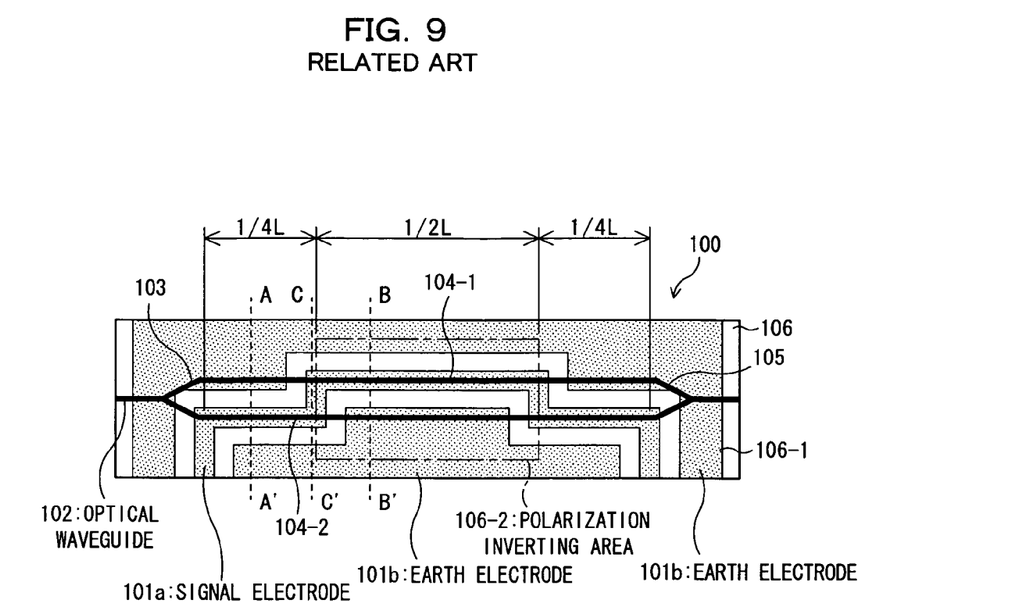
FIG. 9 is an illustration of a conventional technique.

However, the absolute values of the electric fields applied to the two parallel waveguides differ from each other, and since Δna<Δnb, a phenomenon (chirp) occurs where the wavelength of the output light varies in the transition phase from the ON-state of the light to the OFF-state thereof. For solving this, for example, there has been proposed the employment of a substrate in which a polarization inversion is made as shown in FIG. 9. In an optical modulator 100 shown in FIG. 9, a substrate is designated at numeral 106 and is equipped with an area 106-1 and a polarization inverting area 106-2 in which the electro-optical characteristic, i.e., the phase modulation characteristic of the light propagated in an optical waveguide in conjunction with an applied voltage, is in an inverted condition with respect to the area 106-1.

In addition, in FIG. 9, an optical waveguide 102 is formed on the substrate 106 and is composed of an incidence side Y-branched waveguide 103, two parallel waveguides 104-1, 104-2 and an outgoing side Y-branched waveguide 105, and a signal electrode 101a passes on one parallel waveguide 104-1 in the non-inverting area 106-1 and passes on the other parallel waveguide 104-2 in the polarization inverting area 106-2. Moreover, numeral 101b designates an earth electrode, and 108 depicts a buffer layer interposed between the substrate 106 and the electrodes 101a, 101b.

In the optical modulator 100 shown in FIG. 9, in a case in which the overall length L1 of the non-inverting area 106-1 in an optical propagation direction is equal to the length L2 of the inverting area 106-2 in an optical propagation direction, the lights passing through the two parallel waveguides 104-1 and 104-2 respectively vary by +Δθs and −Δθg in the non-inverting area 106-1 and espectively vary +Δθg and −Δθs in the polarization inverting area 106-2.

Accordingly, the phases of the lights passing through the two parallel waveguides 104-1 and 104-2 respectively vary by +(Δθs+Δθg) and −(Δθs+Δθg) in the Y-branched waveguide 105, which provides a phase modulation so that the absolute values are equal to each other but the signs being reverse to each other. This enables the wavelength chirp to become zero with respect to the light to be outputted from the Y-branched waveguide 105. Moreover, the adjustment of the chirp quantity becomes feasible by changing the ratio between the aforesaid L1 and L2.

Figure 10A:
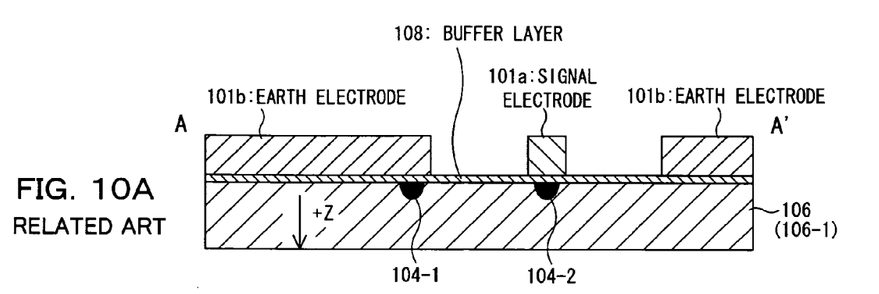
FIGS. 10A to 10C are illustrations of a conventional technique.
Figure 10B:
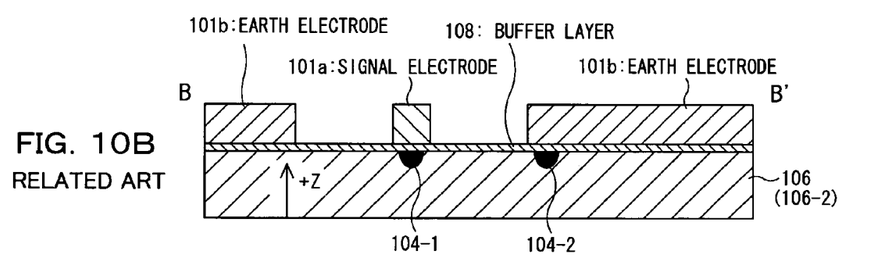
Figure 10C:
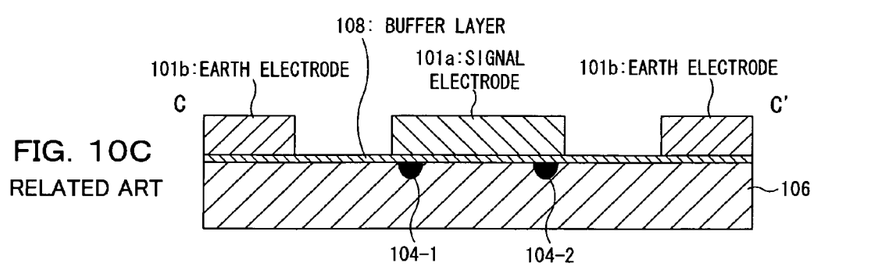

FIG. 10A is a cross-sectional view taken along a line A-A' in the optical modulator 100 shown in FIG. 9, FIG. 10B is a cross-sectional view taken along a line B-B' in the optical modulator 100 shown in FIG. 9, and FIG. 10C is a cross-sectional view taken along a line C-C' at the boundary portion between the non-inverting area 106-1 and the polarization inverting area 106-2 in the optical modulator 100 shown in FIG. 9. The signal electrode 101a is formed on the parallel waveguide 104-2 in the non-inverting area 106-1 and on the parallel waveguide 104-1 in the polarization inverting area 106-2. Therefore, as shown in FIG. 10C, at the boundary portion between the non-inverting area 106-1 and the polarization inverting area 106-2, the signal electrode 101a makes a connection between the upper portions of the parallel waveguide 104-1 and the parallel waveguide 104-2.

In addition, in the case of such an optical modulator using a substrate having electro-optical effects, an optical waveguide having a ridge configuration (structure) is obtainable in a manner such that both external sides of an optical waveguide (in FIG. 9, the parallel waveguides 104-1 and 104-2) in an interactive area are dug through the use of etching or the like to form grooves. In comparison with an optical waveguide formed on a flat substrate without having grooves, an optical waveguide with this ridge configuration is capable of improving the electric field application efficiency to this optical waveguide when an electric field is applied through electrodes, lowering the drive voltage and enhancing the broadbandization in modulation-possible optical wavelength. Still additionally, because of a high containment of light to the waveguide, in particular, also in the case of the formation of a waveguide having a curve with a small radius, the loss is reducible.

Figure 11:
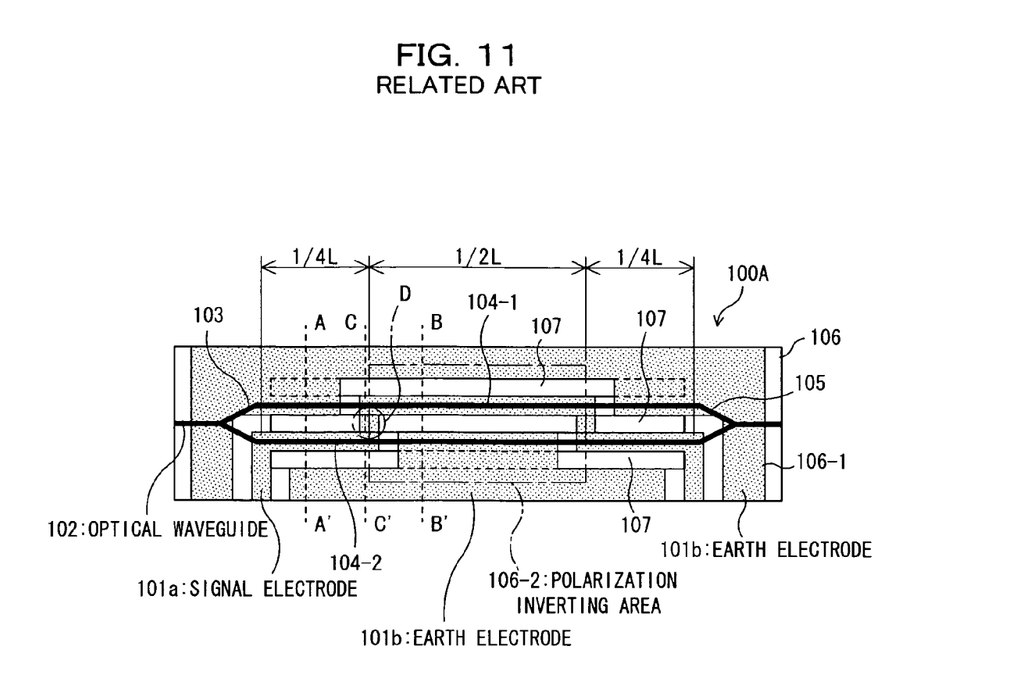
FIG. 11 is an illustration of a conventional technique.
Figure 12A:
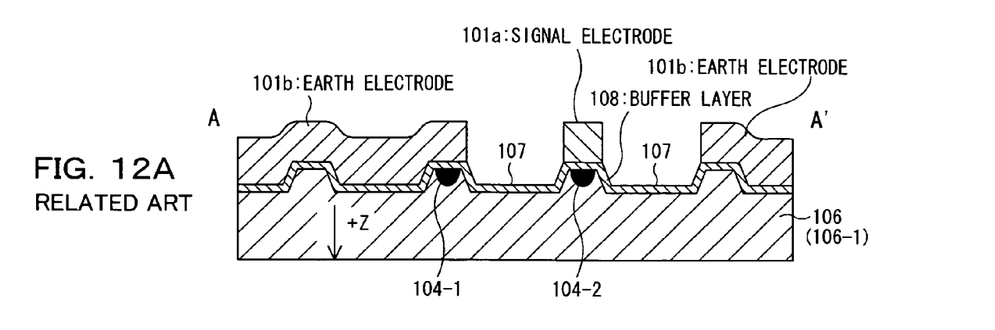
FIGS. 12A, 12B and 12C are illustrations of a conventional technique.
Figure 12B:
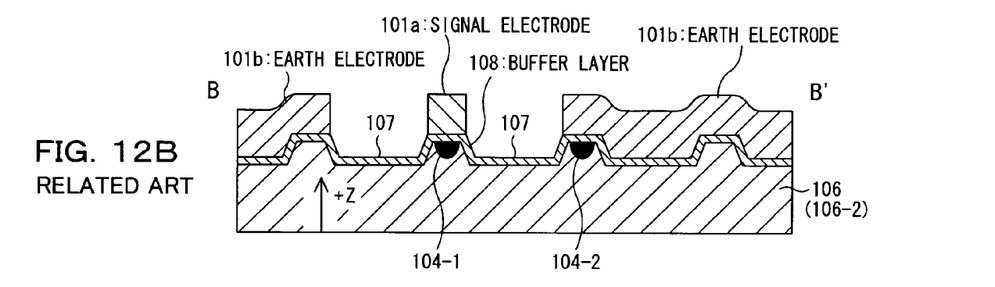
Figure 12C:
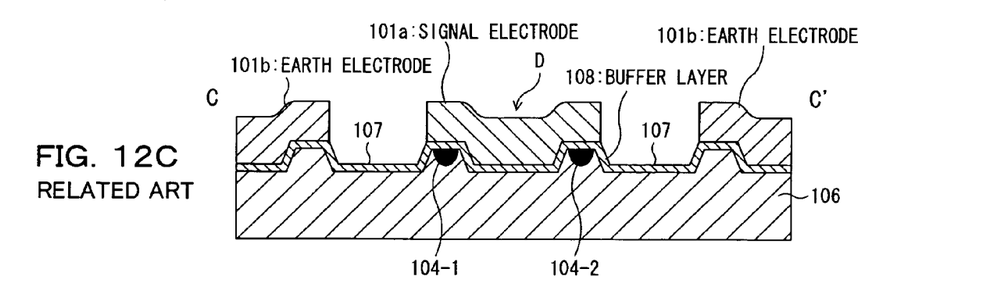

Therefore, through the use of an optical modulator having the aforesaid polarization inverting area and having a ridge configuration, it is expectable to achieve higher light containment in a waveguide, reduction of drive voltage and the enhancement of broadbandization while advancing the aforesaid wavelength chirp suppression. In this case, for example, it is considered that an optical modulator 100A is constructed as shown in FIG. 11 or FIGS. 12A to 12C. FIG. 12A is a cross-sectional view taken along a line A-A' in the optical modulator 100A shown in FIG. 11, FIG. 12B is a cross-sectional view taken along a line B-B' in the optical modulator 100A shown in FIG. 11, and FIG. 12C is a cross-sectional view taken along a line C-C' at the boundary portion between a non-inverting area 106-1 and a polarization inverting area 106-2 in the optical modulator 100A shown in FIG. 11.

In the optical modulator 100A shown in FIGS. 11 and 12A to 12C, grooves 107 are made at both external sides of parallel waveguides 104-1 and 104-2, thereby enabling the parallel waveguides 104-1 and 104-2 to provide an optical waveguide with the aforesaid ridge configuration. Additionally, a ridge configuration is formed outside the parallel waveguides 104-1 and 104-2 having the ridge configuration.

Furthermore, for the construction of the aforesaid optical modulator 100A shown in FIG. 11, in addition to the optical waveguide 102, an signal electrode 101a and an earth electrode 101b are formed on a substrate 106 in which the grooves 107 are formed at both the external sides of the parallel waveguides 104-1 and 104-2. Also in this case, the signal electrode 101a makes a connection between the upper portions of the parallel waveguide 104-1 and the parallel waveguide 104-2 in the boundary portion between a non-inverting area 106-1 and a polarization inverting area 106-2.

Incidentally, the well-known techniques connected with the present invention, there are the following patent documents 1 to 4.

[Patent Document 1]
Japanese Patent Laid-Open No. 2003-228033
[Patent Document 2]
Japanese Patent Laid-Open No. HEI 11-101962
[Patent Document 3]
Japanese Patent Laid-Open No. 2001-194637
[Patent Document 4]
Japanese Patent Laid-Open No. 2003-233047

However, in the case of realizing both the aforesaid polarization inverting area and ridge waveguide in a single optical modulator, a signal electrode comes down to the bottom of a groove at the boundary portion between the polarization inverting area and the non-inverting area and, hence, a disconnection of the electrode tends to occur at this portion. In addition, when the electrode comes into contact with a side surface of the ridge, a discontinuity of the characteristic impedance (impedance mismatch) occurs, which interferes with the enhancement of broadbandization of a modulator.

For example, for the construction of the aforesaid optical modulator shown in FIGS. 11 and 12A to 12C, in the construction, the signal electrode 101a falls to the bottom of the groove 107 at the portion D (see FIGS. 11 and 12C) forming the boundary between the non-inverting area 106-1 and the polarization inverting area 106-2 and, hence, a disconnection of the signal electrode 101a tends to occur at this portion, and when the electrode 101a comes into contact with a side wall of the ridge structure of the parallel waveguides 104-1 and 104-2, a discontinuity of the characteristic impedance can occur.

Incidentally, each of the techniques disclosed in the aforesaid patent documents 1 to 4 cannot eliminate the above-mentioned problems arising in a case in which both the polarization inverting area and ridge waveguide are realized in a single optical modulator.

SUMMARY OF THE INVENTION

The present invention has been developed with a view to eliminating these problems, and it is therefore an object of the invention to provide an optical modulator capable of, in a case in which both a polarization inverting area and ridge waveguide are realized in a single optical modulator, preventing a disconnection of an electrode and remedying a discontinuity of characteristic impedance. For this purpose, in accordance with an aspect of the present invention, there is provided an optical modulator comprising a substrate having an electro-optical effect, first and second optical waveguides formed on the substrate to be disposed in parallel with each other, a groove made between the first and second optical waveguides, a polarization inverting area formed in a portion of an area on the substrate, on which the first and second optical waveguides are formed, and made such that a characteristic of the electro-optical effect is inverted with respect to that of the other area on the substrate, a first electrode for developing an interaction between light propagating through the first and second optical waveguides and an electric signal applied thereto, and a second electrode for developing a reference electric potential with respect to the electric signal applied to the first electrode, wherein the first electrode includes an inverting area electrode portion formed above one of the first and second optical waveguides in the polarization inverting area, a non-inverting area electrode portion formed above the other one of the first and second optical waveguides in the other area, and a connection portion for making a connection between the inverting area electrode portion and the non-inverting area electrode portion at the boundary between the polarization inverting area and the other area, with a supporting mechanism for supporting the connection portion of the first electrode being provided in the groove.

In addition, in the aforesaid optical modulator, outer grooves are made outside the first and second optical waveguides so that, in cooperation with the groove, the outer grooves define the first and second optical waveguides as a ridge optical waveguide.

Still additionally, it is also appropriate that a central position of the polarization inverting area in a light propagation direction corresponds to a central position of the first and second optical waveguides in the same light propagation direction.

Yet additionally, it is also appropriate that the polarization inverting area occupies half the first and second optical waveguides in the light propagation direction.

Moreover, it is also appropriate that the supporting mechanism is constructed as a bottom contact preventing mechanism for preventing the first electrode from coming into contact with a bottom of the groove.

Still moreover, it is also appropriate that the supporting mechanism is constructed as a side wall contact preventing mechanism for preventing the first electrode from coming into contact with a side wall of the groove.

Yet moreover, the supporting mechanism can also be constructed with a groove partitioning portion made to divide the groove, with an island portion located on the groove, or with a groove narrowing portion made to reduce the width of the groove.

In this case, the groove narrowing portion can also be constructed as a peninsula portion formed on a side wall of one of the first and second optical waveguides.

More preferably, the supporting mechanism is made of an insulating material having a refractive index lower than that of the substrate.

Furthermore, it is also appropriate that outer grooves are made outside the first and second optical waveguides so that, in cooperation with the groove, the outer grooves define the first and second optical waveguides as a ridge optical waveguide, wherein both external sides of the first and second optical waveguides embed an insulating material equal in quality to the insulating material constituting the supporting mechanism.

Still furthermore, the first and second optical waveguides can also be constructed as a portion of a Mach-Zehnder type optical waveguide.

Yet furthermore, the first and second optical waveguides can also be constructed with a linear waveguide, or with a bend waveguide having a bending angle equal to or more than approximately 90 degrees.

Preferably, a difference in characteristic impedance between the connection portion of the first electrode and the inverting area electrode portion/the non-inverting area electrode portion is set at approximately 10Ω and below.

As described above, according to the present invention, the supporting mechanism formed in the groove can support the connection portion of the first electrode, which prevents a disconnection from occurring at a portion of the first electrode, which traverses the groove, and prevents the first electrode from coming into contact with a bottom portion of the groove or a side wall of the first and second optical waveguides, thereby stabilizing the characteristic impedance.

DESCRIPTION OF THE PREFERRED EMBODIMENTS

Embodiments of the present invention will be described hereinbelow with reference to the drawings.

[A] Description of First Embodiment

Figure 1:
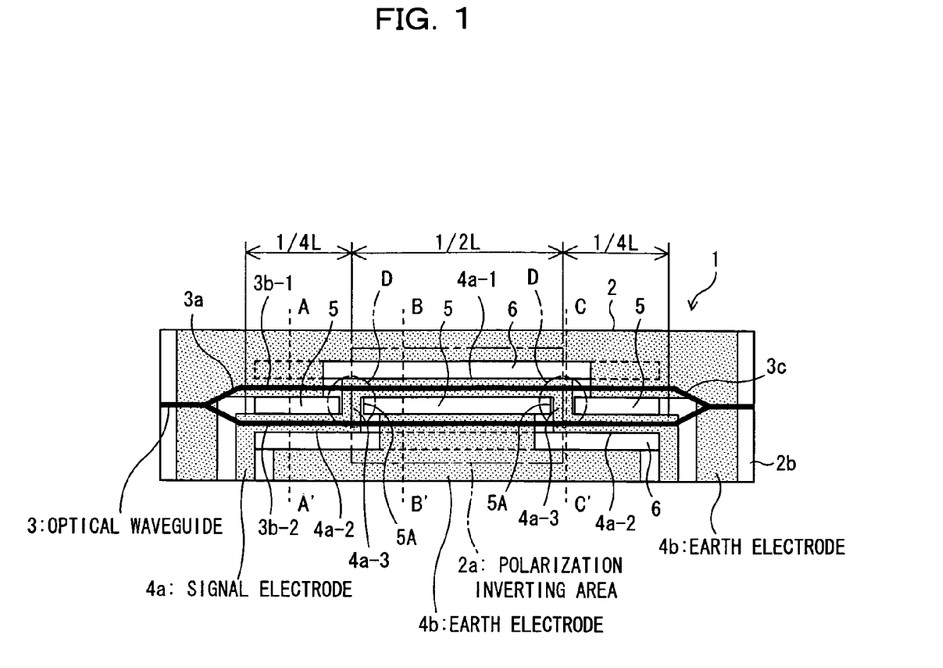
FIG. 1 is a top view illustratively showing an optical modulator according to a first embodiment of the present invention.

FIG. 1 is a top view illustratively showing an optical modulator 1 according to a first embodiment of the present invention. In the optical modulator 1 shown in FIG. 1, numeral 3 designates a Mach-Zehnder type optical waveguide produced from a Z-cut substrate 2, such as LiNbO$_3$, having electro-optical effects by means of titanium diffusion, proton replacement or the like. The Mach-Zehnder type optical waveguide 3 is composed of an optical input side Y-branched waveguide 3a, linear waveguides (first and second optical waveguides) 3b-1 and 3b-2 disposed substantially in parallel with each other, and an optical output side Y-branched waveguide 3c.

In addition, a groove 5 is made by means of dry etching between the linear waveguides 3b-1 and 3b-2, which forms an interactive area. Outside the linear waveguides 3b-1 and 3b-2 on a substrate surface, outer grooves 6 are made through the dry etching as well as the groove 5. In cooperation with the groove 5, the outer grooves 6 define the linear waveguides 3b-1 and 3b-2 as an optical waveguide having a ridge configuration (structure).

As mentioned above, when the linear waveguides 3b-1 and 3b-2 are formed into an optical waveguide with a ridge configuration, in comparison with a substrate optical waveguide having a configuration shown in FIG. 9, the reduction of the drive voltage becomes more reducible and the containment of light in the waveguides becomes more increasable so that the broadbandization of the modulation-possible optical wavelength region is expectable.

Still additionally, in the Mach-Zehnder type optical waveguide 3, a portion of a substrate area, in which formed are the linear waveguides 3b-1 and 3b-2 establishing the interactive area as mentioned above, is made as a polarization inverting area 2a. This polarization inverting area 2a is an area in which the characteristic of the electro-optical effect is inverted with respect to the other area 2b, and in response to a voltage applied thereto through electrodes 4a and 4b which will be mentioned later, the phase modulation characteristic of light propagating through the optical waveguide 3 is inverted with respect to the area 2b other than the polarization inverting area. Incidentally, the polarization inverting area 2a is formed by conducting the patterning through the use of a resist or the like and then applying a high pulse electric field thereto.

Moreover, a signal electrode is designated at reference numeral 4a, and serves as a first electrode for, when an electric signal is applied thereto, developing an interaction between the light propagating through the linear waveguides 3b-1, 3b-2 and the aforesaid applied electric signal. An earth electrode is designated at reference numeral 4b, and acts as a second electrode for generating a reference electric potential with respect to the electric signal to be applied to the signal electrode 4a. In this embodiment, although the signal electrode 4a is formed on upper portions of the linear waveguide 3b-1 or 3b-2 because of the employment of the Z-cut substrate 2, in the case of other crystal axis directions, for example, the employment of an X-cut substrate, a signal electrode and an earth electrode are properly formed to have a pattern corresponding to the direction of an electric field to the optical waveguide.

That is, an optical signal can be modulated and outputted from the Y-branched waveguide 3c in a manner that varies the phase of light propagating through the linear waveguides 3b-1 and 3b-2 by a microwave electric signal applied thereto through the signal electrode 4a.

Still moreover, the signal electrode 4a is composed of an inverting area electrode portion 4a-1 formed on an upper portion of the linear waveguide 3b-1 in the polarization inverting area 2a, a non-inverting area electrode portion 4a-2 formed on an upper portion of the linear waveguide 3b-2 in the other area 2b other than the polarization inverting area 2a, and connection portions 4a-3 made to establish a connection between the inverting area electrode portion 4a-1 and the non-inverting area electrode portion 4a-2 at the boundary between the polarization inverting area 2a and the other area 2b.

Yet moreover, the polarization inverting area 2a occupies half (½) the aforesaid linear waveguides 3b-1 and 3b-2 in the light propagation direction. Therefore, the optical phase characteristic to be modulated in the polarization inverting area 2a and the optical phase characteristic to be modulated in the other area 2b other than the polarization inverting area 2a provide the same variation quantity but making the inversion in polarity with respect to each other, which offsets the wavelength chirp quantities in the polarization inverting area 2a and the other area 2b, thus suppressing the wavelength chirp quantity of an optical signal to be outputted from the Y-branched waveguide 3c to almost zero. In this connection, the ratio of the length of the polarization inverting area 2a in the light propagation direction and the length of the linear waveguides 3b-1 and 3b-2 is properly changed in accordance with a wavelength chirp quantity required for the optical modulator 1.

Furthermore, a central position of the aforesaid polarization inverting area 2a in the light propagation direction corresponds to a central position of the linear waveguides 3b-1 and 3b-2 in the same light propagation direction, which prevents the chirp quantity from depending upon the optical frequency. In the optical modulator 1 according to the first embodiment, when the length of the linear waveguides 3b-1 and 3b-2 is taken as L, the length of the linear waveguides 3b-1 and 3b-2 in the polarization inverting area 2a is L/2, while the length of the linear waveguides 3b-1 and 3b-2 in the non-inverting area 2b is L/4 on the Y-branched waveguide 3a side and is L/4 on the Y-branched waveguide 3c side.

Preferably, an electric signal with a modulation microwave component is supplied from the input side of the signal electrode 4a in the light propagation direction and a resistor (not shown) is connected to the endpoint side of the signal electrode 4a in the light propagation direction to provide a traveling-wave electrode, thereby exhibiting the modulation performance of the optical modulator 1 at a relatively high speed.

Meanwhile, in the modulator 1 according to the first embodiment, groove partitioning portions 5A for supporting the connection portions 4a-3 constituting the aforesaid signal electrode 4a are provided in the groove 5 interposed between the linear waveguides 3b-1 and 3b-2. The groove partitioning portions 5A are formed as an area in which the substrate 2 is not dug as the groove 5 through the patterning when the groove 5 is made by means of dry etching. In other words, in the first embodiment, the groove partitioning portion 5A is made of a substrate material.

Figure 2A:
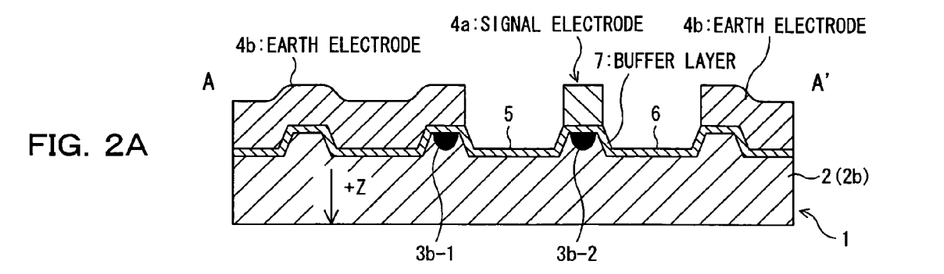
FIGS. 2A, 2B and 2C are illustrations useful for explaining a structure of a supporting mechanism constituting the optical modulator according to the first embodiment.
Figure 2B:
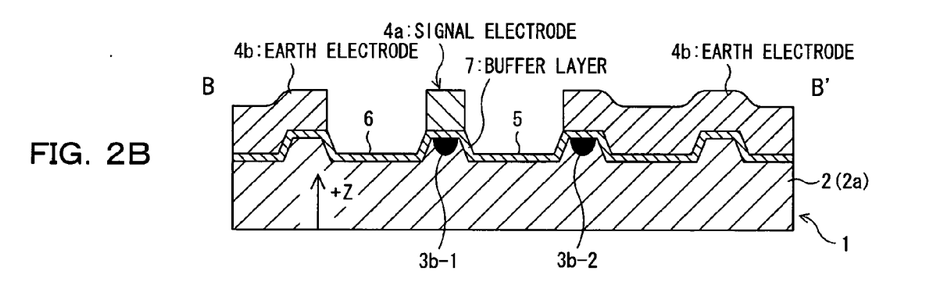
Figure 2C:
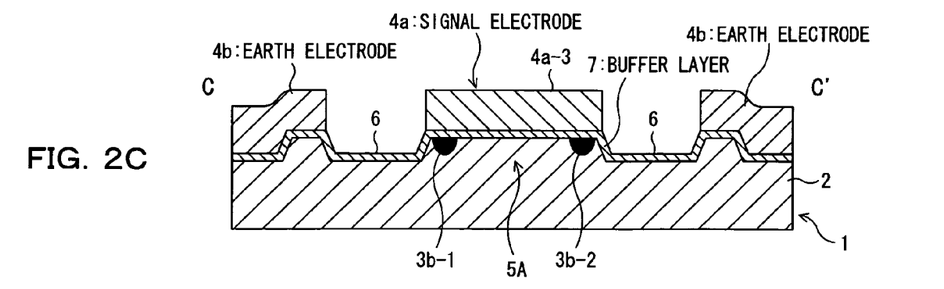

FIGS. 2A to 2C are illustrations useful for explaining a structure of the above-mentioned supporting mechanism 5A. FIG. 2A is a cross-sectional view taken along a line A-A' in the optical modulator 1 shown in FIG. 1, FIG. 2B is a cross-sectional view taken along a line B-B' in the optical modulator 1 shown in FIG. 1, and FIG. 2C is a cross-sectional view taken by a line C-C' along the boundary between the polarization inverting area 2a and the non-inverting area 2b in the optical modulator 1 shown in FIG. 1. As shown in FIGS. 2A to 2C, a buffer layer 7 is interposed between the electrodes 4a, 4b and the substrate 2.

As shown in FIGS. 2A and 2B, the groove 5 is formed in the polarization inverting area 2a in which the inverting area electrode portion 4a-1 is produced and in the non-inverting area 2b in which the non-inverting area electrode portion 4a-2 is produced while, as shown in FIG. 2C, this groove 5 is partitioned at only places (places D in FIG. 1) in which the connection portions 4a-3 are formed. That is, the connection portions 4a-3 are formed on an upper side of the groove partitioning portions 5A which are the groove 5 divided areas.

The connection portions 4a-3 of the signal electrode 4a can be formed at flat and stable points forming upper parts of the groove partitioning portions 5A thus constructed, thus preventing the disconnection of the signal electrode 4a and enabling the formation of the signal electrode 4a having a uniform thickness, which remedies the discontinuity of the characteristic impedance. Moreover, the groove partitioning portion 5A is made as a bottom contact preventing mechanism which prevents the connection portion 4a-3 constituting the electrode 4a from coming into contact with a bottom of the groove 5 and further as a side wall contact preventing mechanism which prevents the connection portion 4a-3 of the signal electrode 4a from coming into contact with a side wall(s) of the linear waveguides 3b-1 and 3b-2 which define a ridge structure.

With the above-described construction, in the optical modulator 1 according to the first embodiment of the present invention, an interaction occurs between light propagating through the linear waveguides 3b-1, 3b-2 and an electric signal applied to the signal electrode 4a, thereby enabling a modulated optical signal to be outputted from the Y-branched waveguide 3c. At this time, since the linear waveguides 3b-1 and 3b-2 which develop the interaction are formed into an optical waveguide with a ridge structure (ridge optical waveguide) by means of the groove 5 and the outer grooves 6, the effect of the containment of the propagating light in the waveguides increases, which lowers the drive voltage and enhances the broadbandization of the modulation-possible optical wavelength band. Moreover, since the polarization inverting area 2a is formed in the interactive area, the wavelength chirp is suppressible.

In addition, since the connection portions 4a-3 of the signal electrode 4a can be formed on the upper side of the groove partitioning portions 5A forming the groove 5 divided areas, it is possible to support a portion of the signal electrode 4a, which traverses the groove 5, so that no disconnection occurs and further to prevent the signal electrode 4a from coming into contact with a bottom portion of the groove 5 or a side wall (i.e., side walls of the groove 5 and the outer grooves 6) of the linear waveguides 3b-1 and 3b-2 forming a ridge optical waveguide. This can stabilize the characteristic impedance.

In this connection, if a design is made such that the impedance of the connection portion 4a-3 which is a portion of the signal electrode 4a formed on the upper side of the groove partitioning portion 5A is set at a value within a range of approximately ±10Ω of the impedance of the inverting area electrode portion 4a-1 and the non-inverting area electrode portion 4a-2, it is possible to suppress the reflection of a microwave which is an electric signal to be applied.

As described above, with the optical modulator 1 according to the first embodiment of the present invention, the groove partitioning portion 5A serving as a supporting mechanism formed in the groove 5 can support the connection portion 4a-3 of the signal electrode 4a, which can support a portion of the signal electrode 4a traversing the groove 5 so that no disconnection occurs and can prevent the signal electrode 4a from coming into contact with a bottom portion of the groove 5 or a side wall of the linear waveguides 3b-1 and 3b-2 defining a ridge optical waveguide. This provides an advantage in that the stabilization of the characteristic impedance becomes feasible.

[B] Description of Second Embodiment

Figure 3:
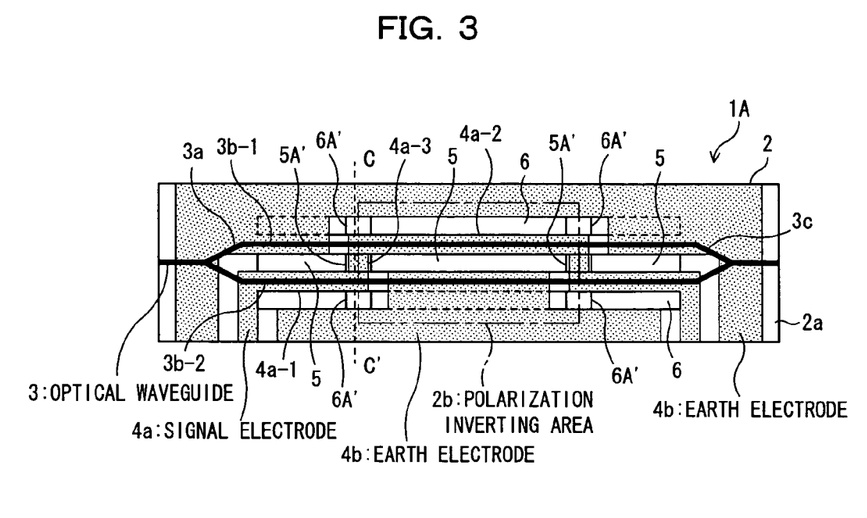
FIG. 3 is a top view illustratively showing an optical modulator according to a second embodiment of the present invention.
Figure 4:
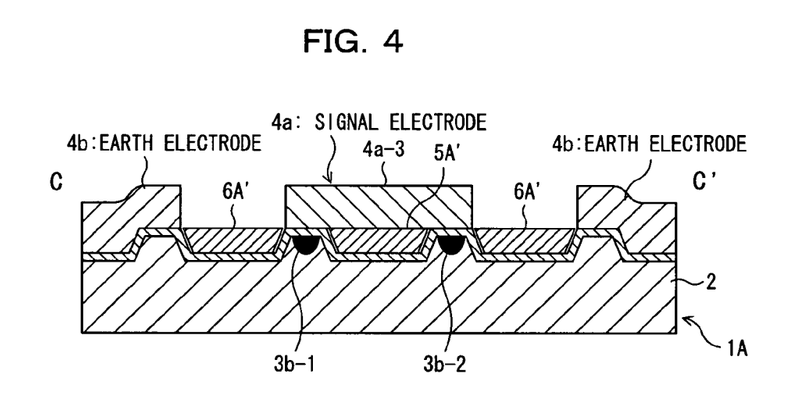
FIG. 4 is a cross-sectional view taken along a line C-C' in the optical modulator shown in FIG. 3.

FIG. 3 is a top view illustratively showing an optical modulator 1A according to a second embodiment of the present invention, and FIG. 4 is a cross-sectional view taken by a line C-C' along the boundary between a polarization inverting area 2a and a non-inverting area 2b in the optical modulator 1A shown in FIG. 3.

The optical modulator 1A according to the second embodiment differs from that (see reference numeral 1) according to the above-described first embodiment in that a polyimide implanted portions 5A' and 6A' are mounted in places forming the boundary between the polarization inverting area 2a and the non-inverting area 2b in a groove 5 and outer grooves 6, with the polyimide implanted portions 5A' and 6A' being formed by implanting (mounting) an insulating material, for example, polyimide, having a refractive index lower than that of the substrate. The other structure is basically similar to that of the above-described first embodiment. In FIGS. 3 and 4, the same reference numerals as those in FIGS. 1 and 2 designate the almost similar parts.

The polyimide implanted portions 5A' mounted in the places forming the boundary between the polarization inverting area 2a and the non-inverting area 2b serve as groove partitioning portions made to divide the groove. That is, a connection portion 4a-3 of a signal electrode 4a is formed on an upper side of this polyimide implanted portion 5A' so that the polyimide implanted portion 5A' can support the connection portion 4a-3.

In addition, when the polyimide implanted portions 5A' where polyimide having a refractive index lower than that of the substrate is implanted are mounted in the places forming the boundary between the polarization inverting area 2a and the non-inverting area 2b in the groove 5 and the outer grooves 6, the scattering of light propagating through the linear waveguides 3b-1 and 3b-2 is more suppressible in comparison with the groove partitioning portions 5A in the above-described first embodiment.

Still additionally, polyimide implanted portions 6A' are mounted in both external sides of the linear waveguides 3b-1 and 3b-2, i.e., in the outer grooves 6, with the polyimide implanted portions 6A' being formed by implanting polyimide which is an insulating material equal in quality to that of the polyimide implanted portions 5A'. This reduces the stress applied to the linear waveguides 3b-1 and 3b-2 forming a ridge structure and improves the temperature stability.

As described above, also with the optical modulator 1A according to the second embodiment of the present invention, the employment of the polyimide implanted portions 5A' provides the advantages similar to those of the above-described first embodiment, and suppresses the scattering of light propagating through the linear waveguides 3b-1 and 3b-2. Moreover, since the polyimide which is an insulating material equal in quality to that of the polyimide implanted portions 5A' is mounted in both the external sides of the linear waveguides 3b-1 and 3b-2, there are advantages of reducing the stress applied to the linear waveguides 3b-1 and 3b-2 forming a ridge configuration and of improving the temperature stability.

[C] Description of Third Embodiment

Figure 5:
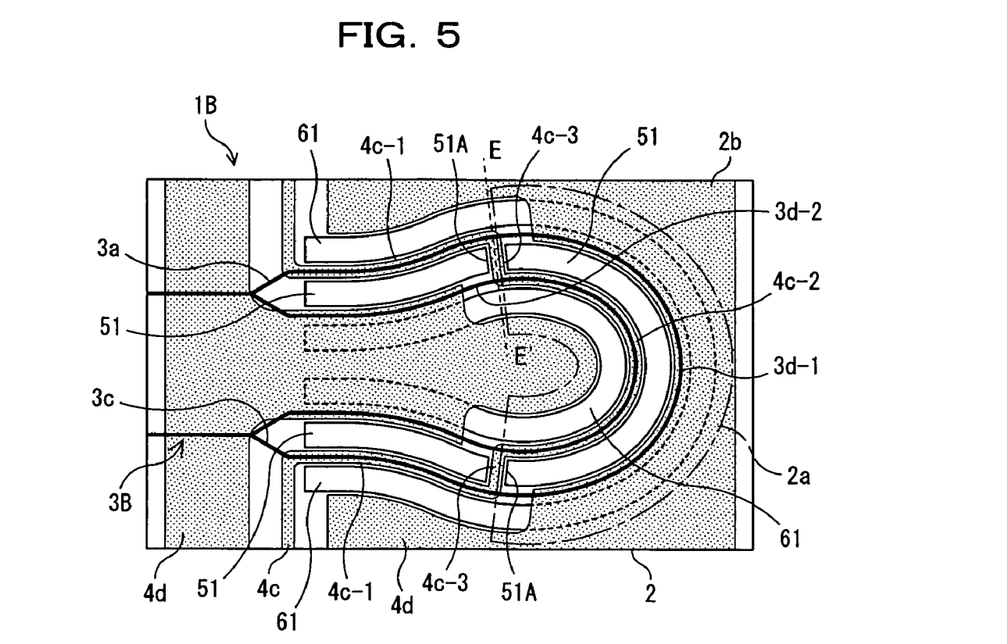
FIG. 5 is a top view illustratively showing an optical modulator according to a third embodiment of the present invention.
Figure 6:
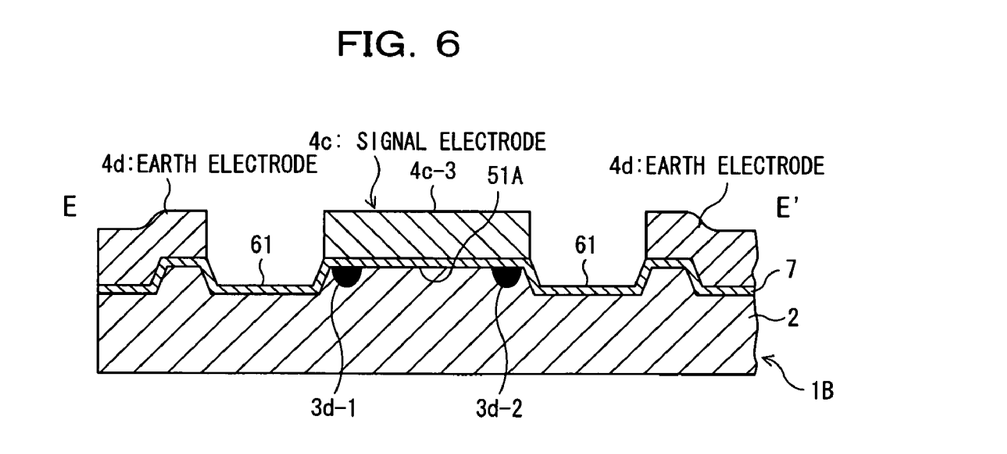
FIG. 6 is an illustration of a construction of an essential part of the optical modulator according to the third embodiment.

FIG. 5 is a top view illustratively showing an optical modulator 1B according to a third embodiment of the present invention, and FIG. 6 is an illustration of a construction of an essential part of the optical modulator 1B according to the third embodiment. The optical modulator 1B according to the third embodiment differs from those (see reference numerals 1 and 1A) according to the above-described first and second embodiments in that, instead of the linear waveguides 3b-1 and 3b-2, a Mach-Zhnder type optical waveguide 3B comprising bend waveguides (first and second optical waveguides) 3d-1 and 3d-2 each having a curve exceeding at least 90 degrees (in this embodiment, approximately 180 degrees) is provided in an interactive area, and a signal electrode 4c and an earth electrode 4d, which have patterns corresponding to the formation patterns of the bend waveguides 3d-1 and 3d-2, are provided. In FIGS. 5 and 6, the same reference numerals as those used in FIGS. 1 to 4 depict almost similar parts.

The optical modulator 1B having the bend waveguides 3d-1 and 3d-2 can reduce the substrate area in comparison with the optical modulators 1 and 1A having linear waveguides, thus making the device structure as an optical modulator module compacter.

In addition, also in the optical waveguide 3B thus constructed, as well as the above-described first and second embodiments, by means of the dry etching, a groove 51 is made between the bend waveguides 3d-1 and 3d-2 forming an interactive area, and outer grooves 61 are made in external sides of the bend waveguides 3b-1 and 3b-2 (see portions indicated by thick dotted lines in FIG. 5). That is, by the cooperation of the groove 51 and the outer grooves 61, the bend waveguides 3d-1 and 3d-2 are formed as an optical waveguide with a ridge structure. The formation of the bend waveguides 3d-1 and 3d-2 into a ridge structure reduces the drive voltage and enhances the containment of light in the waveguides, thus achieving the broadbandization of the modulation-possible optical wavelength region.

Still additionally, as in the case of the above-described first embodiment, a portion of the substrate area in which the bend waveguides 3d-1 and 3d-2 are formed is made as a polarization inverting area 2a similar to those in the first and second embodiments and the other area is made as a non-inverting area 2b which does not conduct the polarization inversion. Yet additionally, the polarization inverting area 2a occupies half the bend waveguides 3d-1 and 3d-2 in the light propagation direction, and the optical phase characteristic to be modulated in the polarization inverting area 2a and the wavelength chirp quantity of an optical signal to be outputted from the Y-branched waveguide 3c are suppressible to almost zero. Moreover, a central position of the aforesaid polarization inverting area 2a in the light propagation direction corresponds to a central position of the bend waveguides 3d-1 and 3d-2 in the light propagation direction, which prevents the chirp quantity from depending upon the optical frequency.

Furthermore, to the formation patterns of the bend waveguides 3d-1 and 3d-2, the signal electrode 4c is made up of a non-inverting area electrode portion 4c-1 formed on an upper portion of the bend waveguide 3d-1 in the non-inverting area 2b, an inverting area electrode portion 4c-2 formed on an upper portion of the bend waveguide 3d-2 in the polarization inverting area 2a, and connection portions 4c-3 for making a connection between the non-inverting area electrode portion 4c-1 and the inverting area electrode portion 4c-2 at the boundary between the polarization inverting area 2a and the non-inverting area 2b. The signal electrode 4c is constructed as a first electrode which, when an electric signal is applied thereto, develops the interaction between the light propagating through the bend waveguides 3d-1 and 3d-2 and the applied electric signal.

Still furthermore, the earth electrode 4*d* is constructed as a second electrode which generates a reference electric potential with respect to the electric signal to be applied to the signal electrode 4*c*. Also in this embodiment, a Z-cut substrate is employed and the signal electrode 4*c* is formed on an upper portion of the bend waveguide 3*d*-1 or 3*d*-2. In the case of other crystal axis directions, for example, the employment of an X-cut substrate, a signal electrode and an earth electrode are formed by properly changing the pattern in accordance with the direction of an electric field to the optical waveguide.

Also in the modulator 1B according to this embodiment, groove partitioning portions 51A each serving as a supporting mechanism to support the aforesaid connection portion 4*c*-3 constituting the signal electrode 4*c* are provided in the groove 51 interposed between the bend waveguides 3*d*-1 and 3*d*-2. FIG. 6 is a cross-sectional view (see E-E' in FIG. 5) focusing on the places along the boundary between the polarization inverting area 2*a* and the non-inverting area 2*b* in the modulator 1B shown in FIG. 5 and is almost similar to the cross-sectional view of FIG. 2C.

As shown in FIG. 6, the groove 51 is divided at only the places of formation of the connection portions 4*c*-3. That is, the aforesaid connection portions 4*c*-3 are formed on an upper side of the groove partitioning portions 51A forming the groove 51 divided areas. Since the connection portions 4*a*-3 of the signal electrode 4*a* can be formed at flat and stable points forming upper parts of the groove partitioning portions 51A, it is possible to prevent a disconnection of the signal electrode 4*c*, and since the signal electrode 4*c* can be formed to have a uniform thickness, it is possible to improve the discontinuity of the characteristic impedance.

In addition, the groove partitioning portion 51A is constructed as a bottom contact mechanism which prevents the connection portion 4*c*-3 constituting the signal electrode 4*c* from coming into contact with a bottom of the groove 51 and further constructed as a side wall contact preventing mechanism which prevents the connection portion 4*c*-3 of the electrode 4*c* from coming into contact with a side wall of the bend waveguides 3*d*-1 and 3*d*-2 having a ridge structure.

With the above-described construction, also in the optical modulator 1B according to the third embodiment of the present invention, since the connection portions 4*c*-3 of the signal electrode 4*c* can be formed on an upper side of the groove partitioning portions 51A forming a groove 51 divided area, it is possible to support portions of the signal electrode 4*c* traversing the groove 51 so that no disconnection occurs, and since it is possible to prevent the signal electrode 4*c* from coming into contact with a bottom portion of the groove 51 or with a side wall (that is, a side wall of the groove 51 or the outer grooves 61) of the bend waveguides 3*d*-1 and 3*d*-2 establishing a ridge optical waveguide, the stabilization of the characteristic impedance becomes feasible.

In this connection, if a design is made such that the impedance of the connection portion 4*c*-3 which is a portion of the signal electrode 4*c* formed on the upper side of the groove partitioning portion 51A is set at a value within a range of approximately ±10 Ω of the impedance of the non-inverting area electrode portion 4*c*-1 and the inverting area electrode portion 4*c*-2, it is possible to suppress the reflection of a microwave which is an electric signal to be applied.

As described above, with the optical modulator 1B according to the third embodiment of the present invention, the groove partitioning portion 51A serving as a supporting mechanism formed in the groove 51 can support the connection portion 4*c*-3 of the signal electrode 4*c*, which can support a portion of the signal electrode 4*c* traversing the groove 51 so that no disconnection occurs and can prevent the signal electrode 4*c* from coming into contact with a bottom portion of the groove 51 or a side wall of the bend waveguides 3*d*-1 and 3*d*-2 defining a ridge optical waveguide, thus providing an advantage in that the stabilization of the characteristic impedance becomes feasible.

Although, as the supporting mechanism according to the third embodiment, the groove partitioning portions 51A for partitioning the groove 51 is made of a material identical to the substrate material, according to the present invention, it is also appropriate that, as well as the above-described second embodiment, an insulating material having a refractive index relatively lower than that of the substrate material is implanted in the groove 51, or that an insulating material equal in quality is also implanted in the outer grooves 61 at a place corresponding to the implantation place of the insulating material for the groove partitioning portion 51A.

[D] Others

It should be understood that the present invention is not limited to the above-described embodiments, and that it is intended to cover all changes and modifications of the embodiments of the invention herein which do not constitute departures from the spirit and scope of the invention.

For example, although, in the above-described first and third embodiments, the supporting mechanism for supporting the connection portion 4*a*-3, 4*c*-3 of the signal electrode 4*a*, 4*c* is constructed as the groove partitioning portion 5A, 51A made to partition the groove 5, 51, the present invention is not limited to this. Concretely, as shown in FIGS. 7A and 8A, a supporting mechanism can also be constructed as an island-like portion 5B, 51B made on the groove 5, 51, and as shown in FIGS. 7B and 8B, it can also be constructed as a groove narrowing portion 5C, 51C made to reduce the width of the groove 5, 51.

Figure 7A:
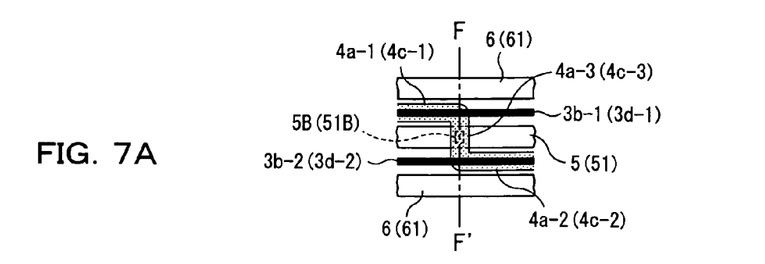
FIGS. 7A and 7B are illustrations of a modification of this embodiment.
Figure 8A:
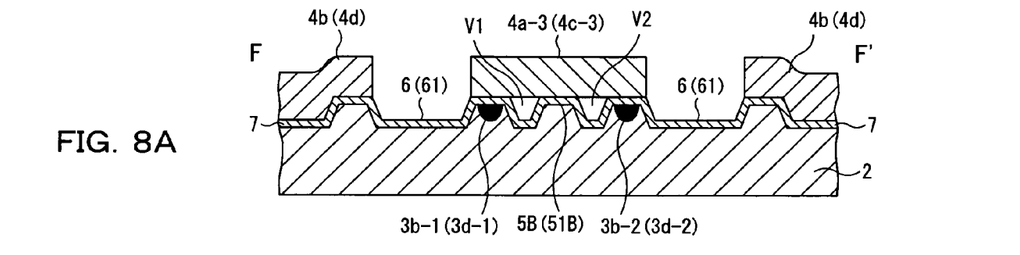
FIGS. 8A and 8B are illustrations of a modification of this embodiment.

FIG. 7A is an illustration of an essential part of an optical modulator focusing on an island-like portion 5B (51B) made in the groove 5 (51), and FIG. 8A is a cross-sectional view taken along a line F-F' of FIG. 7A. Also in a case in which the island-like portion 5B (51B) is formed as the supporting mechanism as shown in FIGS. 7A and 8A, the advantages similar to those of the above-described first and third embodiment are obtainable, and since spaces V1 and V2 can be defined between the island-like portion 5B (51B) and the waveguides 3*b*-1 and 3*b*-2 (3*d*-1 and 3*d*-2) formed under the connection portion 4*c*-3, the scattering of the light propagating through the waveguides 3*b*-1 and 3*b*-2 (3*d*-1 and 3*d*-2) is effectively suppressible.

Figure 7B:
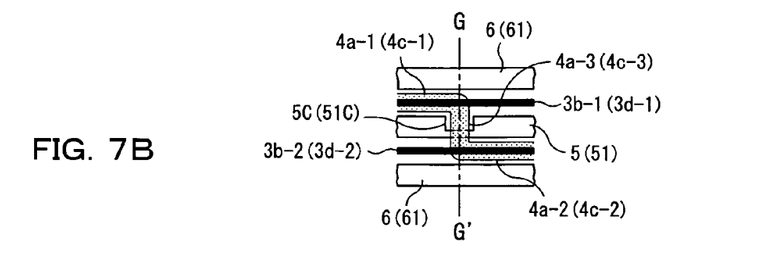
Figure 8B:
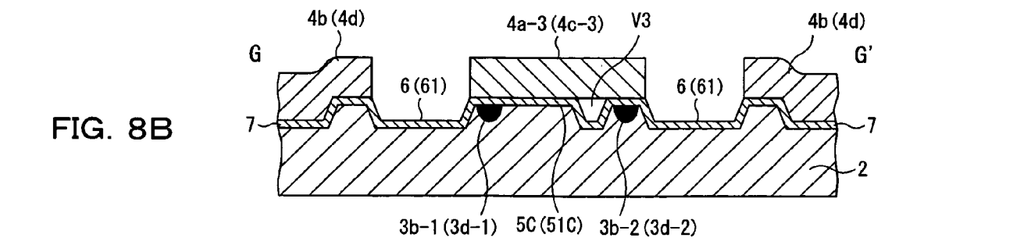

FIG. 7B is an illustration of a structure of an essential part of an optical modulator 1 (1B) focusing on a groove narrowing portion 5C (51C) made to reduce the width of the groove 5 (51), and FIG. 8B is a cross-sectional view taken along a light G-G' of FIG. 7B. As shown in FIGS. 7B and 8B, the groove narrowing portion 5C (51C) is constructed as a peninsula-like portion formed on a side wall of the waveguide 3*b*-1 (3*d*-1) in the groove 5 (51).

Also in a case in which the groove narrowing portion 5C (51C) is formed as the supporting mechanism as shown in FIGS. 7B and 8B, the advantages similar to those of the above-described first and third embodiment are obtainable and, in particular, since a space V3 can be defined outside the inner waveguide 3*d*-2 of the bend waveguides 3*d*-1 and 3d-2 in the third embodiment, the scattering of the light propagating through this waveguide 3d-2 is effectively suppressible.

In addition, it is also appropriate that the aforesaid island-like portion 5B (51B) or groove narrowing portion 5C (51C) is made of an insulating material such as polyimide having a refractive index lower than that of the substrate as well as the above-described second embodiment. In comparison with the case in which the island-like portion 5B (51B) or the groove narrowing portion 5C (51C) is made of the substrate material, this can further improve the light scattering suppression effect.

Still additionally, the above-described embodiments enable the manufacturing of the devices according to the present invention.

What is claimed is:

1. An optical modulator comprising:
a substrate having an electro-optical effect;
first and second optical waveguides formed on said substrate;
a groove made between said first and second optical waveguides;
a polarization inverting area formed in a portion of an area on said substrate, on which said first and second optical waveguides are formed, and made such that a characteristic of the electro-optical effect is inverted with respect to that of the other area on said substrate;
a first electrode for developing an interaction between light propagating through said first and second optical waveguides and an electric signal applied thereto; and
a second electrode for developing a reference electric potential with respect to said electric signal applied to said first electrode,
said first electrode including an inverting area electrode portion formed above one of said first and second optical waveguides in said polarization inverting area, a non-inverting area electrode portion formed above the other one of said first and second optical waveguides in the other area, and a connection portion for making a connection between said inverting area electrode portion and said non-inverting area electrode portion at a boundary between said polarization inverting area and the other area, and
a supporting mechanism for supporting said connection portion of said first electrode being provided in said groove.

2. The optical modulator according to claim 1, further comprising outer grooves made outside said first and second optical waveguides so that, in cooperation with said groove, said outer grooves define said first and second optical waveguides as a ridge optical waveguide.

3. The optical modulator according to claim 2, wherein a polarization inverting area occupies half said first and second optical waveguides in said light propagation direction.

4. The optical modulator according to claim 2, wherein a polarization inverting area occupies half said first and second optical waveguides in said light propagation direction.

5. The optical modulator according to claim 2, wherein a central position of said polarization inverting area in a light propagation direction corresponds to a central position of said first and second optical waveguides in said light propagation direction.

6. The optical modulator according to claim 5, wherein said polarization inverting area occupies half said first and second optical waveguides in said light propagation direction.

7. The optical modulator according to claim 1, wherein a polarization inverting area occupies half said first and second optical waveguides in said light propagation direction.

8. The optical modulator according to claim 1, wherein said supporting mechanism is constructed as a bottom contact preventing mechanism for preventing said first electrode from coming into contact with a bottom of said groove.

9. The optical modulator according to claim 1, wherein said supporting mechanism is constructed as a side wall contact preventing mechanism for preventing said first electrode from coming into contact with a side wall of said groove.

10. The optical modulator according to claim 1, wherein said supporting mechanism is constructed with a groove partitioning portion made to partition said groove.

11. The optical modulator according to claim 1, wherein said supporting mechanism is constructed with an island portion located on said groove.

12. The optical modulator according to claim 1, wherein said supporting mechanism is constructed with a groove narrowing portion made to reduce a width of said groove.

13. The optical modulator according to claim 12, wherein said groove narrowing portion can also be constructed as a peninsula portion formed on a side wall of one of said first and second optical waveguides.

14. The optical modulator according to claim 1, wherein said supporting mechanism is made of an insulating material having a refractive index lower than that of said substrate.

15. The optical modulator according to claim 14, further comprising outer grooves made outside said first and second optical waveguides so that, in cooperation with said groove, said outer grooves define said first and second optical waveguides as a ridge optical waveguide; wherein
both external sides of said first and second optical waveguides embed an insulating material equal in quality to said insulating material of said supporting mechanism.

16. The optical modulator according to claim 1, wherein said first and second optical waveguides are constructed as a portion of a Mach-Zehnder type optical waveguide.

17. The optical modulator according to claim 1, wherein said first and second optical waveguides are constructed with a linear waveguide.

18. The optical modulator according to claim 1, wherein said first and second optical waveguides are constructed with a bend waveguide having a bending angle equal to or more than approximately 90 degrees.

19. The optical modulator according to claim 1, wherein a difference in characteristic impedance between said connection portion of said first electrode and said inverting area electrode portion or said non-inverting area electrode portion is set at approximately 10Ω and below.

20. An optical modulator comprising:
a substrate having an electro-optical effect and a polarization inverting area in a portion of the substrate;
a groove between first and second optical waveguides;
a first electrode having a first portion covering a portion of the first optical waveguide, a second portion covering a portion of the second optical waveguide in the polarization inverting area, and a connecting portion connecting the first portion and the second portion;
a second electrode covering portions of portions of the first and second optical waveguides which are not covered by the first electrode; and
a supporting mechanism provided in the groove and supporting the connection portion of the first electrode.

21. An optical modulator comprising:

a substrate having an electro-optical effect and a polarization inverting area;

first and second optical waveguides formed on the substrate with a groove between the first and second optical waveguides;

a first electrode having a first portion covering a portion of the first optical waveguide, a second portion covering a portion of the second optical waveguide in the polarization inverting area, and a connecting portion connecting the first portion and the second portion;

a second electrode covering portions of the first and second optical waveguides which are not covered by the first portion or the second portion of the first electrode; and a supporting mechanism provided in the groove and supporting the connection portion of the first electrode.

22. An optical modulator comprising:

a substrate having an electro-optical effect and a polarization inverting area;

first and second optical waveguides formed on the substrate with a groove between the first and second optical waveguides;

a first electrode having a first portion covering a portion of the first optical waveguide, a second portion covering a portion of the second optical waveguide in the polarization inverting area, and a connecting portion connecting the first portion and the second portion;

a second electrode covering portions of the first and second optical waveguides which are not covered by the first portion or the second portion of the first electrode; and means, provided in the groove, for supporting the connection portion of the first electrode.

* * * * *

UNITED STATES PATENT AND TRADEMARK OFFICE
CERTIFICATE OF CORRECTION

PATENT NO. : 7,099,524 B2
APPLICATION NO. : 10/990383
DATED : August 29, 2006
INVENTOR(S) : Masaki Sugiyama It is certified that error appears in the above-identified patent and that said Letters Patent is hereby corrected as shown below:

Column 13, Line 53-54, change "polarization inverting area occupies half said first and second optical waveguides in said light propagation direction" to -- central position of said polarization inverting area in a light propagation direction corresponds to a central position of said first and second optical waveguides in said light propagation direction--.

Column 13, Line 56, change "a" to --said--.

Column 13, Line 57, change "said" to --a--.

Column 13, Line 58, change "claim 2" to --claim 1--.

Column 14, Line 1, change "a" to --said--.

Column 14, Line 3, change "said" to --a--.

Signed and Sealed this

Sixteenth Day of January, 2007

JON W. DUDAS
*Director of the United States Patent and Trademark Office*